United States Patent Office 3,544,657
Patented Dec. 1, 1970

3,544,657
HARD-ELASTIC AND IMPACT-RESISTANT COATINGS
Ernst-Christian Schütze, Karl-Heinz Hornung, and Rudolf Nehring, Marl, Germany, assignors to Chemische Werke Huels, A.G., Marl, Germany
No Drawing. Filed Dec. 28, 1967, Ser. No. 694,069
Claims priority, application Germany, Jan. 3, 1967, C 41,123
Int. Cl. C08g *37/32, 37/34*
U.S. Cl. 260—850
19 Claims

ABSTRACT OF THE DISCLOSURE

Hard coatings having high elasticity and high impact strength are prepared by curing an aminoplast with a polycarbonate of the formula:

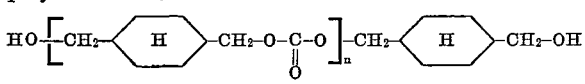

wherein $n$ is an integer from 5–20 inclusive.

BACKGROUND OF THE INVENTION

This invention relates to coating compositions and cured coatings obtained therefrom. The coating compositions comprise a mixture of (a) linear polyesters containing hydroxyl groups and (b) aminoplasts.

It is known from German Auslegeschrift (published application) 1,015,165 (column 5) that coatings can be produced by curing a mixture of a phthalic acid-fumaric acid propylene glycol polyester and a butylated melamine-formaldehyde resin. Resulting coatings, however, exhibit poor chemical resistance. Moreover, mixtures of linear polyesters and melamine-formaldehye resin yield cured coatings which, although elastic, are soft (see Comparative Examples I and II).

It is also known from German Auslegeschrift 1,015,165 that coatings having an extraordinarily high resistance to chemicals can be obtained by combining an alkylated melamine-formaldehyde or urea-formaldehyde condensation product with a linear polyester produced by polyesterification of adicarboxylic acid with a diol of Formula I:

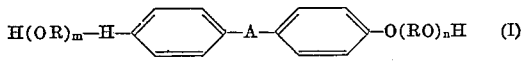

wherein

A represents a 2-alkylidene radical of 3–4 carbon atoms;
R represents an alkylene radical of 2–3 carbon atoms; and
$m$ and $n$ are each at least 1, the sum of $m$ and $n$ not being larger than 3.

Although the thus-produced coatings are hard, they are dull and very brittle (see Comparative Examples III and IV).

SUMMARY OF THE INVENTION

An object of this invention is to provide novel coatings wherein high elasticity and impact strength are combined with great hardness.

Another object is to provide novel coating compositions and ingredients for same.

Upon further study of the specification and claims, other objects and advantages of the present invention will become apparent.

To attain the objects of this invention, a hydroxy-containing polycarbonate of the formula:

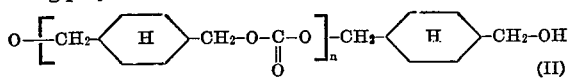

wherein $n$ represents 5 to 20, preferably 5 to 15, is admixed with an aminoplast to form a coating composition. The coating composition, applied to a substrate, is then cured in a conventional manner.

Dihydroxy polycarbonates of the above formula are obtained by reacting 1,4-bis-(hydroxymethyl)-cyclohexane with phosgene. In this connection, 1,4-bis-(hydroxymethyl)-cyclohexane can be employed in its trans form or in its cis form, or as a mixture of both forms. This process permits the adjustment of $n$, wherein $n$ represents the average degree of polymerization. For more details see Belgian patent specification No. 693,956 (U.S. patent application Ser. No. No. 610,230, filed Jan. 19, 1967).

Aminoplasts useful for this invention include uncured reaction products of aldehydes, particularly formaldehyde, with substances carrying several amino or amido groups, e.g., melamine, urea, N, N'-ethylene urea, dicyanodiamide and benzoguanamine. Particularly suitable are the aminoplasts modified with alcohols, such as methanol, ethanol, i-propanol, n-propanol, i-butanol, n-butanol. The aminoplasts are etherified with that alcohols. In place of resinous precondensates, it is also possible to employ, as aminoplasts as defined by this invention, precursor thereof, e.g. hexamethylol melamine, dimethylol urea, hexamethoxymethyl melamine, hexabutoxymethyl melamine, dimethoxymethyl urea, dibutoxymethyl urea. A wide variety of commercially available aminoplasts is available for combination with the linear polyesters employed in accordance with the present invention. For more details regarding the aminoplasts which can be used, reference is made to "Organic Protective Coatings," Von Fischer and Bobaleck, 1953, Reinhold, pages 210 to 225; "Lackkunstharze" by H. Wagner and H. F. Sarx, Carl Hanser Verlag, Munich, 4th edition, 1959, pages 60 to 74.

For producing the coatings, the polycarbonate and the aminoplast are first dissolved in a conventional varnish solvent, e.g., xylene and/or butanol, the weight ratio of polycarbonate:aminoplast being from about 60:40 to 90:10. The resulting varnish, optionally pigmented to form an enamel, is then applied and baked at a temperature of from 100° to 200° C. Since the cross-linking reactions occurring during this step are catalytically accelerated by acids, it is preferable to add acidic substances to the varnish. Upon the addition of, for example, 2% (by weight) of p-toluenesulfonic acid (based on the weight of the aminoplast), the cross-linking reaction takes place sufficiently rapidly at 130° C. By the addition of larger amounts of acid, it is possible to produce mixtures which also cure at room temperature.

The cross-linking is achieved by reaction between the hydroxyl or carboxyl groups of the polyester and the N-methylol or N-methylol-ether groups of the aminoplast. More information upon the structures of the cross-linked groups will be found in the literature, e.g. "Lackkunstharze" by H. Wagner and H. F. Sarx, pages 66 and 70; D. H. Solomon and J. J. Hopwood, Journ. Appl. Pol. Sci. 10, 981 (1966).

Before the curing step there is essentially no reaction between the two ingredients. At room temperature the storability of the coating compositions, which contain no catalyst, is nearly unlimited, at least several years.

The coatings produced in accordance with this invention have a multitude of excellent properties. They have a high gloss and are resistant to solvents, such as xylene, gasoline-benzene mixtures, esters and ketones. In salt spray tests, in tropical condition tests and in tests in the weatherometer, the coatings demonstrate a superior ability to withstand the most extreme environments.

However, the most noteworthy property of the coatings produced in accordance with this invention is the combination of high elasticity and impact strength with great hardness.

The elastic behavior (elongation) of coatings is customarily determined by the Erichsen depression test (according to DIN [German Industrial Standard] 53,156), indicating, as a measure for the elasticity, the depression of the varnished sheet metal in mm. at which the layer of varnish begins to tear. It is essential for this testing method to have the deformation of the coating take place slowly (advancement: 0.2 mm./sec.). An indication of the behavior of coatings upon sudden deformation is sought to be obtained by a so-called impact depression measurement. This measurement can be conducted, for example, with the impact depression device 226/D of Erichsen, Hemer-Sundwig. In this device, a hemisphere having a radius of 10 mm. is impressed, by a falling weight, into the sheet metal (the unvarnished side facing upwardly). By varying the height of the fall, the depression can be varied. The depression value (in mm.) is indicated at which the varnish coating begins to tear. (The values listed in the examples were obtained in this manner. In many examples, the value is stated to be >5 mm., since the device described above, with the 1 mm. thick deep-drawn steel sheets utilized for the test, does not make a greater depression possible.)

Coatings of linear polyesters and aminoplasts are known which are elastic (and in that case also withstand impact stresses); however, these coatings exhibit a very low hardness (according to DIN 53,157). On the other hand, coatings having a high hardness are known which are, however, non-extensible (non-elastic) and cannot withstand any impact stress. Contrary thereto, the coatings obtained according to this invention exhibit a high impact strength and elasticity, as well as great hardness.

This spectrum of properties opens a wide field of applications to the coatings of this invention. In addition to the varnishing or enameling of individual parts subjected to high impact stress, the coatings are particularly well suited for varnishing materials which are shaped, e.g., by punching, subsequent to the coating step.

Therefore, the coating compositions of this invention may be used for varnishing or enameling of e.g. automobile bodies, refrigerators, washing machines etc., also they are suited for coil-coating. The coatings produced in accordance with this invention may be applied by different modes, e.g. spraying, dipping, brushing and wiping.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

All parts, percentages and ratios set forth in the examples are by weight and all temperatures are in degrees centigrade unless otherwise stated.

EXAMPLE 1

Mix 234 g. of a 30% xylene solution of polycarbonate of Formula II ($n=13$) with 54.5 g. of a 55% 1:1 xylene-butanol mixture solution of a melamine-formaldehyde condensate. For test purposes, apply the thus-prepared varnish to test steel sheets and then bake said sheets for 30 minutes at 190° C. The resultant films have a hardness (according to DIN 53,157) of 176 seconds, a deep-drawing ability of 10 mm. (according to DIN 53,156) and an impact depression of >5 mm. The coating thickness of the films upon which the tests are conducted are, in all examples, 50 to 60$\mu$, said films being obtained by spraying.

EXAMPLE 2

Admix 0.45 g. of p-toluenesulfonic acid with 288.5 g. of the varnish of Example 1 before applying same to metal test sheets and baking the thus-varnished sheets for 30 minutes at 130° C. The resultant coatings have a hardness of 203 seconds, a deep-drawing capacity of 8.3 mm., and an impact depression of 5 mm.

EXAMPLE 3

Mix 267 g. of a 30% xylene solution of a polycarbonate of Formula II ($n=13$) with 40 g. of a 50% xylene of hexa-(methoxymethyl)-melamine solution.

Apply the varnish to metal test sheets and bake the varnished sheets at 190° C. for 30 minutes. The resultant films have a hardness of 209 seconds, a deep-drawing capacity of 10 mm., and an impact depression of >5 mm. The same results are obtained with hexa-(butoxymethyl)-melamine, di-(methoxymethyl)-urea, di-(butoxymethyl)-urea.

EXAMPLE 4

Add 0.4 g. of p-toluenesulfonic acid to 307 g. of the varnish of Example 3. Then apply the varnish to metal test sheets and bake the varnished sheets at 130° C. for 30 minutes. The resultant films exhibit a hardness of 200 seconds, a deep-drawing ability of 10 mm., and an impact depression of >5 mm.

EXAMPLE 5

Mix 234 g. of a 30% xylene solution of polycarbonate of Formula II ($n=10$) with 54.5 g. of a 55% 1:1 xylene-butanol mixture solution of a melamine-formaldehyde condensate. (Maprenal TTX, produced by Cassella as used in Example 1). For testing purposes, apply the thus-prepared varnish to metal test sheets and bake the varnished sheets at 190° C. for 30 minutes. The resultant films have a hardness of 154 seconds, a deep-drawing capacity of 8.2 mm., and an impact depression of >5 mm.

EXAMPLE 6

To 288.5 g. of the varnish of Example 5, add 0.45 g. of p-toluenesulfonic acid prior to applying same to metal test sheets and then baking the sheets at 130° C. for 30 minutes. The resultant films have a hardness of 212 seconds, a deep-drawing capacity of 8.1 mm., and an impact depression of >5 mm.

EXAMPLE 7

By pigmenting 288.5 g. of the varnish described in Example 5 with 50 g. of titanium dioxide, an enamel is produced. Apply this enamel to metal test sheets and bake the enameled sheets at 190° C. for 30 minutes. The resultant films possess a hardness of 201 seconds, a deep-drawing ability of 9.1 mm. and an impact depression of >5 mm.

EXAMPLE 8

Mix 234 g. of a 30% xylene solution of polycarbonate of Formula II ($n=10$) with 50 g. of a 60% butanol solution of a urea-formaldehyde condensate and with 0.45 g. of p-toluenesulfonic acid. For testing purposes, apply the varnish to metal test sheets and bake the thus-varnished sheets at 130° C. for 30 minutes. The resultant films exhibit a hardness of 209 seconds, a deep-drawing capability of 9.7 mm. and an impact depression of >5 mm.

The used urea-formaldehyde condensate is a commercial product (Plastopal EBS 400) of the Badische Anilin- und Sodafabriken.

EXAMPLE 9

Mix 234 g. of a 30% solution of polycarbonate of Formula II ($n=8$) with 27.3 g. of a 55% 1:1 xylene-butanol mixture solution of a melamine-formaldehyde condensate (as described in Example 1), and 24.2 g. of a 62% butanol solution of a benzoguanamine-formaldehyde condensate. For testing purposes, apply the thus-prepared varnish to metal test sheets and bake the resulting varnished sheets for 30 minutes. The resultant films have a hardness of 156 seconds, a deep-drawing ability of 10 mm. and an impact depression of >5 mm.

The benzoguanamine-formaldehyde condensate is a commercial product (Maprenal HM) of the Cassella AG.

EXAMPLE 10

To 261.3 g. of the varnish of Example 9, add 0.45 g. of p-toluenesulfonic acid prior to applying same to metal test sheets and baking the varnished sheets at 130° C. for 30 minutes. The resultant films have a hardness of 215 seconds, a deep-drawing ability of 8.2 mm. and an impact depression of >5 mm.

EXAMPLE 11

Pigment 261.3 g. of the varnish of Example 9 with 300 g. of titanium dioxide. Apply the thus-prepared enamel to metal test sheets, and bake the enameled sheets at 190° C. for 30 minutes. The resultant films have a hardness of 102 seconds, a deep-drawing ability of 10 mm. and an impact depression of 2.2 mm. In spite of the high content of pigment, the extensibility is fully preserved; the impact depression is likewise satisfactory.

COMPARATIVE EXAMPLE I

Under a nitrogen purge stream, heat 316 parts of adipic acid (2.16 mols), 480 parts of phthalic acid anhydride (3.24 mols), and 374 parts of ethylene glycol (6.5 mols) slowly to 160° to 200° C., until 11.8 parts of distillate pass over. (In this connection, maintain the passing over temperature at the head of the column at a maximum of 100° C.) Subsequently, under an increasing vacuum, distill off 19 parts over a period of 6 hours. The polyester thus prepared has an acid number of 3 to 4 and a hydroxyl number of 56. Dissolve said polyester in a 1:1:1 xylene-methylethyl ketone-cyclohexanone mixture to form a 50% solution. Mix 70 parts of this solution with 30 parts of a 50% solution of a melamine-formaldehyde condensate (prepared as in Example 1) in a 1:1 xylene-butanol mixture. Pigment the resulting clear varnish with 25 parts of $TiO_2$. For testing purposes, apply the pigmented varnish to metal test sheets and bake the varnished sheets at 190° C. for 30 minutes. The resultant films exhibit a hardness of 23 seconds, a deep-drawing ability of 7.7 mm. and an impact depression of >5 mm. The representation of the acid or hydroxy number is: mg. KOH/g. polyester.

COMPARATIVE EXAMPLE II

To 100 g. of the enamel of Comparative Example I, add 0.225 g. p-toluenesulfonic acid prior to applying the enamel to metal test sheets and baking the enameled sheets at 130° C. for 30 minutes. The resultant films have a hardness of 25 seconds, a deep-drawing ability of 7.9 mm. and an impact depression of >5 mm.

COMPARATIVE EXAMPLE III

Under a purge stream of nitrogen, heat 1,580 parts (5 mols) of symmetrical bis-(hydroxyethyl)-ether of bisphenol A (4,4'-dihydroxy-dipenyl-dimethylmethane) with 400 parts (4 mols) of succinic acid anhydride for 6 hours to 180° C. Remove residual amounts of water of reaction by the application of a vacuum of about 20 torr (mm. Hg). The thus-produced polyester has an acid number of 5. Dissolve said polyester in a 1:1:1 xylene-methylethylketone-cyclohexanone mixture to form a 50% solution. Mix 70 parts of this solution with 30 parts of a 50% solution of a melamine-formaldehyde condensate (prepared according to Example 1) in a 1:1 xylene-butanol mixture. Pigment the thus-obtained clear varnish with 25 g. of $TiO_2$. Apply the pigmented varnish to metal test sheets, and bake the varnished sheets at 190° C. for 30 minutes. The resultant films have a hardness of 190 seconds, a deep-drawing ability of 1.9 mm. and an impact depression of >1 mm.

COMPARATIVE EXAMPLE IV

Add 0.225 g. of p-toluenesulfonic acid to 100 g. of the enamel of Comparative Example III. Apply the thus-prepared enamel to test metal sheets, and bake the thus-enameled sheets for 30 minutes at 130° C. The resultant films have a hardness of 126 seconds, a deep-drawing ability of 1.1 mm. and an impact depression of <1 mm.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:
1. An uncured coating composition comprising:
   (A) 10 to 40 parts by weight of an uncured aminoplast; and
   (B) 90 to 60 parts by weight of a dihydroxypolycarbonate of the formula:

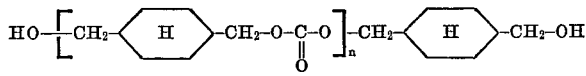

wherein $n$ is an integer from 5 to 20, inclusive, and said aminoplast is a reaction product of an aldehyde with a compound having a plurality of amino or amido groups.

2. An uncured coating composition according to claim 1 wherein the uncured resinous aminoplast is selected from the group consisting of a melamine-formaldehyde condensate, a urea-formaldehyde condensate, and N,N'-ethyleneurea-formaldehyde condensate, a dicyanodiamide-formaldehyde condensate, and a benzoguanamine-formaldehyde condensate.

3. An uncured coating composition according to claim 1 wherein the uncured nonresinous aminoplast is selected from the group consisting of a melamine-formaldehyde condensate, a urea-formaldehyde condensate, and N,N'-ethylene - urea - formaldehyde condensate, a dicyanodiamide-formaldehyde condensate, and a benzoguanamine-formaldehyde condensate.

4. An uncured coating composition according to claim 2 wherein the uncured resinous aminoplast is modified with alcohols selected from the group consisting of methanol, ethanol, i-propanol, n-propanol, i-butanol, n-butanol.

5. An uncured coating composition according to claim 3 wherein the uncured nonresinous aminoplast is modified with alcohols selected from the group consisting of methanol, ethanol, i-propanol, n-propanol, i-butanol, n-butanol.

6. A cured coating produced from the coating composition of claim 1.

7. A cured coating produced from the coating composition of claim 2.

8. A cured coating produced from the coating composition of claim 3.

9. A cured coating produced from the coating composition of claim 4.

10. A cured coating produced from the coating composition of claim 5.

11. An article of manufacture comprising a substrate having superimposed thereon a substantially uniform layer of a cured coating according to claim 6.

12. An article of manufacture comprising a substrate having superimposed thereon a substantially uniform layer of a cured coating according to claim 7.

13. An article of manufacture comprising a substrate having superimposed thereon a substantially uniform layer of a cured coating according to claim 8.

14. An article of manufacture comprising a substrate having superimposed thereon a substantially uniform layer of a cured coating according to claim 9.

15. An article of manufacture comprising a substrate having superimposed thereon a substantially uniform layer of a cured coating according to claim 10.

16. An enamel composition comprising the coating composition of claim 1, pigment, and varnish solvent means.

17. A coating composition according to claim 1 wherein $n$ is 5–15.

18. A coating composition according to claim 1 wherein $n$ is 10.

19. A coating composition according to claim 1 wherein $n$ is 8.

References Cited
UNITED STATES PATENTS

| | | | |
|---|---|---|---|
| 2,787,630 | 4/1957 | Katz et al. | 260—463 |
| 3,227,680 | 1/1966 | Tamblyn et al. | 260—75 |
| 3,245,963 | 4/1966 | Schramm et al. | 260—77.50 |
| 3,248,416 | 4/1966 | Stevens | 260—77.5 |
| 3,449,467 | 6/1969 | Wynstra | 260—850 |

JOHN C. BLEUTGE, Primary Examiner

U.S. Cl. X.R.

117—132, 161; 260—33.4, 33.6, 39, 75, 77.5, 463

UNITED STATES PATENT OFFICE
CERTIFICATE OF CORRECTION

Patent No. 3,544,657        Dated December 1, 1970

Inventor(s) Ernst-Christian Schutze et al

It is certified that error appears in the above-identified patent and that said Letters Patent are hereby corrected as shown below:

Column 1, Line 47, in the formula, should read (I)

Column 1, Line 70, the formula should read

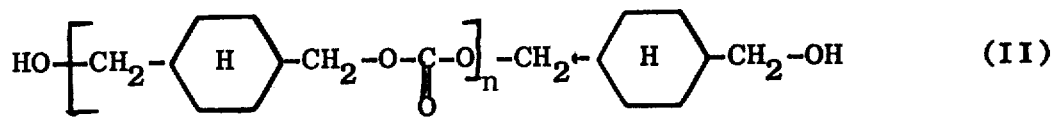 (II)

Column 5, Line 54, within the parentheses, should read (4,4'-dihydroxy-diphenyl-dimethylmethane)

Signed and sealed this 24th day of August 1971.

(SEAL)
Attest:

EDWARD M. FLETCHER, JR.
Attesting Officer

WILLIAM E. SCHUYLER, JR.
Commissioner of Patents